United States Patent
Beneveniste

(10) Patent No.: US 7,711,101 B2
(45) Date of Patent: May 4, 2010

(54) DIRECT CALLING TO DEVICES VIA A SHARED TELEPHONE NUMBER

(75) Inventor: Mathilde Beneveniste, South Orange, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1190 days.

(21) Appl. No.: 11/203,350

(22) Filed: Aug. 12, 2005

(65) Prior Publication Data

US 2006/0034442 A1    Feb. 16, 2006

Related U.S. Application Data

(60) Provisional application No. 60/600,809, filed on Aug. 12, 2004, provisional application No. 60/634,119, filed on Dec. 8, 2004.

(51) Int. Cl.
*H04M 3/42* (2006.01)

(52) U.S. Cl. .............................. 379/211.02; 379/211.03

(58) Field of Classification Search ............ 379/211.02, 379/211, 221.01, 207, 211.03, 211.04, 221.08
See application file for complete search history.

(56) References Cited

U.S. PATENT DOCUMENTS

| | | | |
|---|---|---|---|
| 4,811,381 A | 3/1989 | Woo et al. | |
| 5,487,111 A * | 1/1996 | Slusky .................. | 379/211.03 |
| 6,243,374 B1 | 6/2001 | White et al. | |
| 6,404,874 B1 | 6/2002 | Chestnut | |
| 6,480,484 B2 | 11/2002 | Morton | |
| 6,724,869 B2 | 4/2004 | Chapman et al. | |
| 6,731,625 B1 | 5/2004 | Eastep et al. | |
| 6,798,767 B1 | 9/2004 | Alexander et al. | |
| 6,865,266 B1 | 3/2005 | Pershan | |
| 7,145,898 B1 | 12/2006 | Elliott | |
| 2002/0085701 A1 | 7/2002 | Parsons et al. | |
| 2002/0118671 A1 | 8/2002 | Staples et al. | |
| 2003/0181209 A1 | 9/2003 | Forte | |
| 2004/0184592 A1 | 9/2004 | Kucmerowski | |
| 2004/0234063 A1 * | 11/2004 | Milton et al. .......... | 379/211.02 |
| 2005/0025294 A1 | 2/2005 | Matsuhashi et al. | |
| 2006/0018310 A1 | 1/2006 | Stevens et al. | |

FOREIGN PATENT DOCUMENTS

JP    2000023214 A    2/2000

(Continued)

OTHER PUBLICATIONS

"Korean Patent Application No. 2007-7003368 Office Action", Jul. 28, 2008, Publisher: Korean Intellectual Property Office, Published in: KR.

(Continued)

*Primary Examiner*—Curtis Kuntz
*Assistant Examiner*—Amal Zenati
(74) *Attorney, Agent, or Firm*—DeMont & Breyer, LLC

(57) ABSTRACT

The present invention provides a technique for directly calling telephones via a shared telephone number, which telephones do not have telephone numbers in the address space of the Public Switched Telephone Network. This is particularly useful for visitors and guests who are, for example, temporarily at a hotel, school campus, or business.

20 Claims, 5 Drawing Sheets

FOREIGN PATENT DOCUMENTS

| | | | |
|---|---|---|---|
| JP | 2003046645 | A | 2/2003 |
| JP | 2003092613 | A | 3/2003 |
| WO | 9747123 | A2 | 12/1997 |
| WO | 0239681 | A1 | 5/2002 |

OTHER PUBLICATIONS

A. Kakubari, "JP Application No. 2007-525820 Office Action", Feb. 4, 2009, Publisher: Japan Patent Office, Published in: JP.

Sang-Hyeon Park, "KR Application No. 2007-7003368 Office Action", Jan. 30, 2009, Publisher: Korean Patent Office, Published in: KR.

A. Kakubari, "JP Application No. 2007-525794 Office Action", Feb. 4, 2009, Publisher: Japan Patent Office, Published in: JP.

Hyam, Kristy, "CA Application No. 2,574,071 Office Action May 6, 2009", , Publisher: CIPO, Published in: CA.

Branko, Willems, "EP Application No. 05789847.0-1237 / 1800461 Extended European Search Report Aug. 4, 2009", , Publisher: EPO, Published in: EP.

Branko, Willems, "EP Application No. 05788056.9-1237 / 1779618 Extended European Search Report Aug. 4, 2009" Publisher: EPO, Published in: EP.

"KR Application No. 2007-7003368 Office Action Nov. 21, 2007", , Publisher: KIPO, Published in: KR.

Nguyen, Quynh H., "U.S. Appl. No. 11/203,356 Office Action Sep. 15, 2009", , Publisher: USPTO, Published in: US.

* cited by examiner

DIRECT CALLING TO DEVICES VIA A SHARED TELEPHONE NUMBER

CROSS-REFERENCE TO RELATED APPLICATIONS

This application claims the benefit of:
(1) U.S. Patent Application Ser. No. 60/600,809, filed Aug. 12, 2004, and
(2) U.S. Patent Application Ser. No. 60/634,119, filed Dec. 8, 2004, which are both also incorporated by reference:

U.S. patent application Ser. No. 11/203,356, filed Aug. 12, 2005, entitled "Complementary VoIP Service," is also incorporated by reference.

FIELD OF THE INVENTION

The present invention relates to telecommunications in general, and, more particularly, to the direct calling of devices accessible via a shared telephone number.

BACKGROUND OF THE INVENTION

Many telephones can be directly called because they have a unique telephone number associated with them. This telephone number is an address in the address space of the Public Switched Telephone Network. Many telephones cannot be directly addressed because they are accessible only via a private branch exchange. To call these telephones, you must first call the number for the private branch exchange and then a human operator or interactive voice response system asks for an extension.

The need exists therefore for a technique that enables the direct calling of telephones behind a private branch exchange.

SUMMARY OF THE INVENTION

The present invention provides a technique for directly calling telephones via a shared telephone number, which telephones do not have telephone numbers in the address space of the Public Switched Telephone Network. This is particularly useful for visitors and guests who are, for example, temporarily at a hotel, school campus, or business.

An example in the context of a guest at a hotel will illustrate the features of the illustrative embodiment. When a guest of the hotel desires to receive calls to his or her home telephone at the hotel, he or she directs the telephone company to forward calls to his or her home telephone to the hotel. In the prior art, such calls would be answered by the hotel's switchboard operator or interactive voice-response system and the caller would be asked how to direct the call. In some cases, this is disadvantageous because it alerts the caller that the guest is not at home. It is also disadvantageous because it requires the intervention of the hotel's operator.

In accordance with the illustrative embodiment, when the guest first registers at the hotel, the guest tells the desk clerk the telephone number of the guest's home telephone and the desk clerk enters the number and the extension of the telephone in the guest's room into the hotel's telephone switch and directs the switch to directly forward calls originally directed to the guest's home number to the telephone in the guest's room.

Thereafter, when a call to the guest's home number is forwarded to the hotel, the hotel switch will receive a set-up message from the Public Switched Telephone Network, which set-up message includes the originally-called telephone number (i.e., the guest's home telephone number). The hotel's telephone switch recognizes that the incoming call has been forwarded and extracts the originally-called telephone number from the set-up message. The switch then uses that number to find the hotel extension associated with that number. When it does, it automatically forwards that number to the guest's room without intervention by the hotel's switchboard operator or interactive voice-response system. This saves hotel resources and retains the guest's privacy.

Other embodiments of the present invention provide similar services in similar and different contexts.

The illustrative embodiment comprises: receiving a first call set-up message for a first voice telephone call that has been forwarded from a first originally-called telephone number, wherein the first originally-called telephone number is an address in the address space of the Public Switched Telephone Network; and attempting to establish a voice telephone call with a first device that has an address outside the address space of the Public Switched Telephone Network; wherein the address of the first device is found from the first originally-called telephone number.

DETAILED DESCRIPTION

Figure 1:
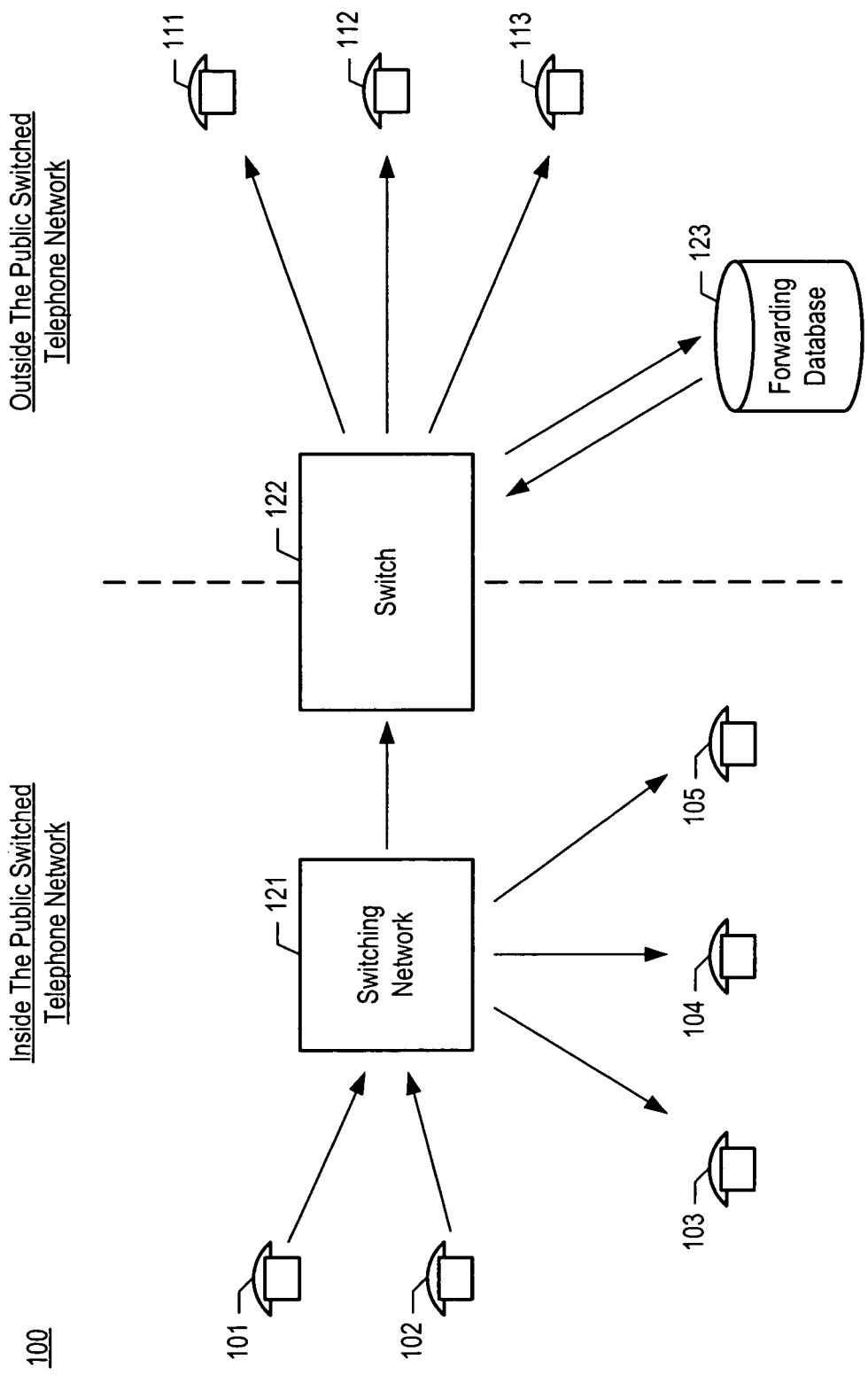
FIG. 1 depicts a schematic diagram of the salient components of a telecommunications system in accordance with the illustrative embodiment of the present invention.

FIG. 1 depicts a schematic diagram of the salient components of a telecommunications system in accordance with the illustrative embodiment of the present invention. System 100 comprises: telephones 101 through 105, telephones 111 through 113, switching network 121, switch 122, and forwarding database 123, interrelated as shown.

Telephones 101 through 105 and switching network 121 reside in the domain of the Public Switched Telephone Network, and telephones 111 through 113, and forwarding database 123 reside outside the domain of the Public Switched Telephone Network. Switch 122 resides in both domains and functions as the bridge between them. It will be clear to those skilled in the art, however, after reading this disclosure, how to make and use alternative embodiments of the present invention in which all of telephones 101 through 105, telephones 111 through 113, switching network 121, switch 122, and forwarding database 123 reside within the domain of the Public Switched Telephone Network.

Telephones 101 through 105 and telephones 111 through 113 are well known in the prior art and are devices that can function as telephones in that they can convert acoustic signals to electrical signals and electrical signals to acoustic signals, telephones 101 through 105 and Telephones 111 through 113 can be special-purpose devices (e.g., a telephone, etc.) that are used only for telephony or general-purpose devices (e.g., a computer, etc.) that can be used for both telephony and non-telephony both.

Each of telephones 101 through 105 and 111 through 113 can be wireline (e.g., Tip-Ring, ISDN, etc.) or wireless (e.g., cordless, cellular, etc.) devices. Each of telephones 101 through 105 is uniquely associated with a unique address (i.e., telephone number) in the address space of the Public Switched Telephone Network. In contrast, each of telephones 111 through 113 is uniquely associated with an extension in the address space of switch 122. In accordance with the illustrative embodiment, telephone 103 is a business telephone, telephone 104 is a residential telephone, and telephone 105 is a dual-use residential and business telephone. It will be clear to those skilled in the art how to make and use telephones 101 through 105 and telephones 111 through 113.

Switching network 121 is well known in the prior art and comprises the hardware and software necessary to receive a telephone call from telephone 101 that is directed to telephone 103 but that is forwarded to switch 122 conditionally or unconditionally. It will be clear to those skilled in the art how to make and use switching network 121.

Switch 122 comprises the hardware and software necessary to perform the functionality described below and with respect to FIGS. 2 through 5. In some embodiments of the present invention, switch 122 is a private branch exchange that serves a hotel, school campus, or business. In some other embodiments, switch 122 is a central office switch owned by a telecommunications service provider that provides service (e.g., Centrex service, etc.) to a hotel, school campus, or business.

Forwarding database 123 is a database that correlates the telephone numbers (i.e., addresses in the address space of the Public Switched Telephone Network) of telephones 101 through 105 with extensions in the address space of switch 122. A portion of forwarding database 123 is depicted in Table 1.

TABLE 1

Forwarding database 123

| Telephone | PSTN Telephone Number | Corresponding extension |
|---|---|---|
| 103 | 648-555-2443 | 111 |
| 104 | 723-753-6642 | 111 |
| ... | ... | ... |
| 105 | 945-843-6321 | 112 |

Figure 2:
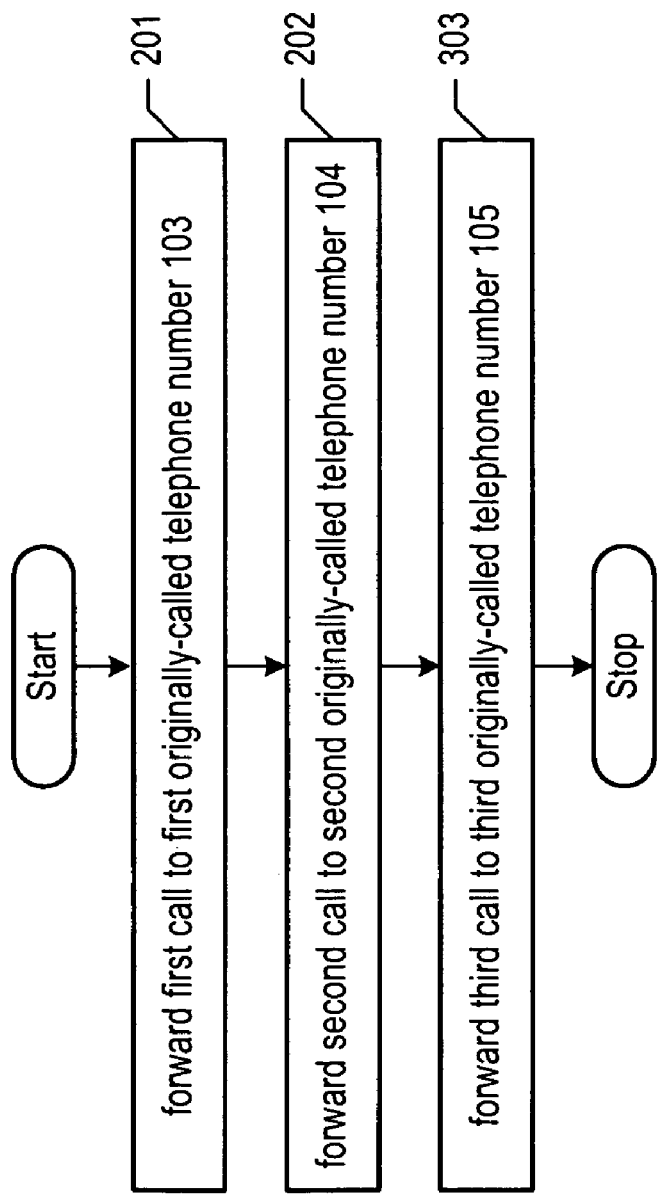
FIG. 2 depicts a flowchart of the salient tasks associated with the operation of the illustrative embodiment.

FIG. 2 depicts a flowchart of the salient tasks associated with the operation of the illustrative embodiment. The flowchart depicts the processing of three telephone calls: In accordance with the first, a first voice call to a first telephone number is forwarded to an extension behind switch 122. In accordance with the second, a second voice call to a second telephone number is forwarded to the same extension behind switch 122. The combination of the first call and the second call demonstrate that the illustrative embodiment can properly forward calls to different numbers to the same extension.

In accordance with the third call, a third voice call to a third telephone number is forwarded to a second extension. The combination of the first call and the third call demonstrates that the illustrative embodiment can properly forward calls to different numbers to different extensions behind switch 122.

Prior to the execution of the tasks in FIG. 2, the user of telephone 103 has mapped the telephone number of telephone 103 (i.e., 648-555-2443) to the telephone number of telephone 111 (i.e., extension 111) and has directed switching network 121 to forward calls to the telephone number for telephone 103 to be forwarded to switch 122. Similarly, the user of telephone 104 has mapped the telephone number of telephone 104 (i.e., 723-753-6642) to the telephone number of telephone 111 (i.e., extension 111) and has directed switching network 121 to forward calls to the telephone number for telephone 104 to be forwarded to switch 122. And again similarly, the user of telephone 105 has mapped the telephone number of telephone 105 (i.e., 945-843-6321) to the telephone number of telephone 112 (i.e., extension 112) and has directed switching network 121 to forward calls to the telephone number for telephone 105 to be forwarded to switch 122.

At task 201, the illustrative embodiment forwards a first voice call that is originally placed to telephone 103 to extension 111.

At task 202, the illustrative embodiment forwards a second voice call that is originally placed to telephone 104 to extension 111.

At task 203, the illustrative embodiment forwards a third voice call that is originally placed to telephone 105 to extension 112.

Figure 3:
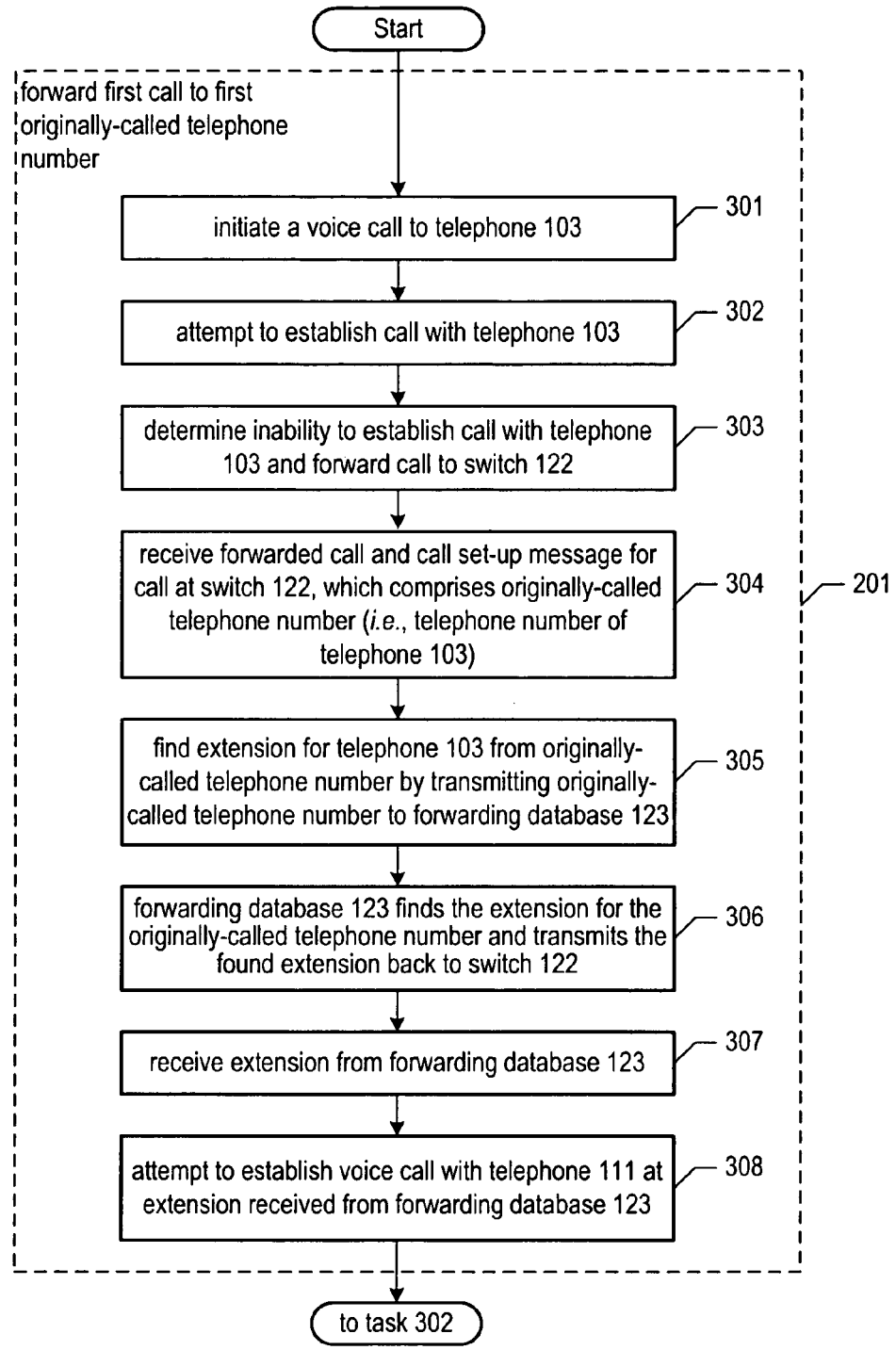
FIG. 3 depicts a flowchart of the salient tasks associated with the operation of task 201.

FIG. 3 depicts a flowchart of the salient tasks associated with the operation of the illustrative embodiment.

At subtask 301, a voice call is initiated in well-known fashion, from telephone 101 to telephone 103 by dialing the PSTN telephone number 648-555-2443.

At subtask 302, switching network 121 attempts to set up the call with telephone 103 in well-known fashion.

At subtask 303, switching network 121 is unable to set up the call with telephone 103, and, therefore, forwards the call to switch 122. This could be because there was no one available to answer telephone 103, or because all calls to telephone 103 were conditionally or unconditionally forwarded to switch 122. When a call to telephone 103 is forwarded to switch 122, switching network 121 transmits, as part of subtask 303, a set-up message (e.g., an SS7 ISUP set-up message, etc.) to switch 122, which message contains the originally-called telephone number (i.e., 648-555-2443—the telephone number of telephone 103).

At subtask 304, switch 122 receives the set-up message and by examining it in well-known fashion, knows that the call has been forwarded to it. Because the call was forwarded to it, switch 122 extracts the originally-called telephone number from the set-up message and begins the process of establishing the call to the extension associated with the originally-called telephone number (i.e., the telephone number of telephone 111).

At subtask 305, switch 122 transmits the originally-called telephone number (i.e., 648-555-2443) to forwarding database 123.

At subtask 306, forwarding database 123 finds the extension (i.e., extension 111) that corresponds to the originally-called telephone number and transmits the found extension back to switch 122.

At subtask 307, switch 122 receives the extension (i.e., extension 111) from forwarding database 123.

At subtask 308, switch 122 attempts, in well-known fashion, to establish the voice call with extension 111.

Figure 4:
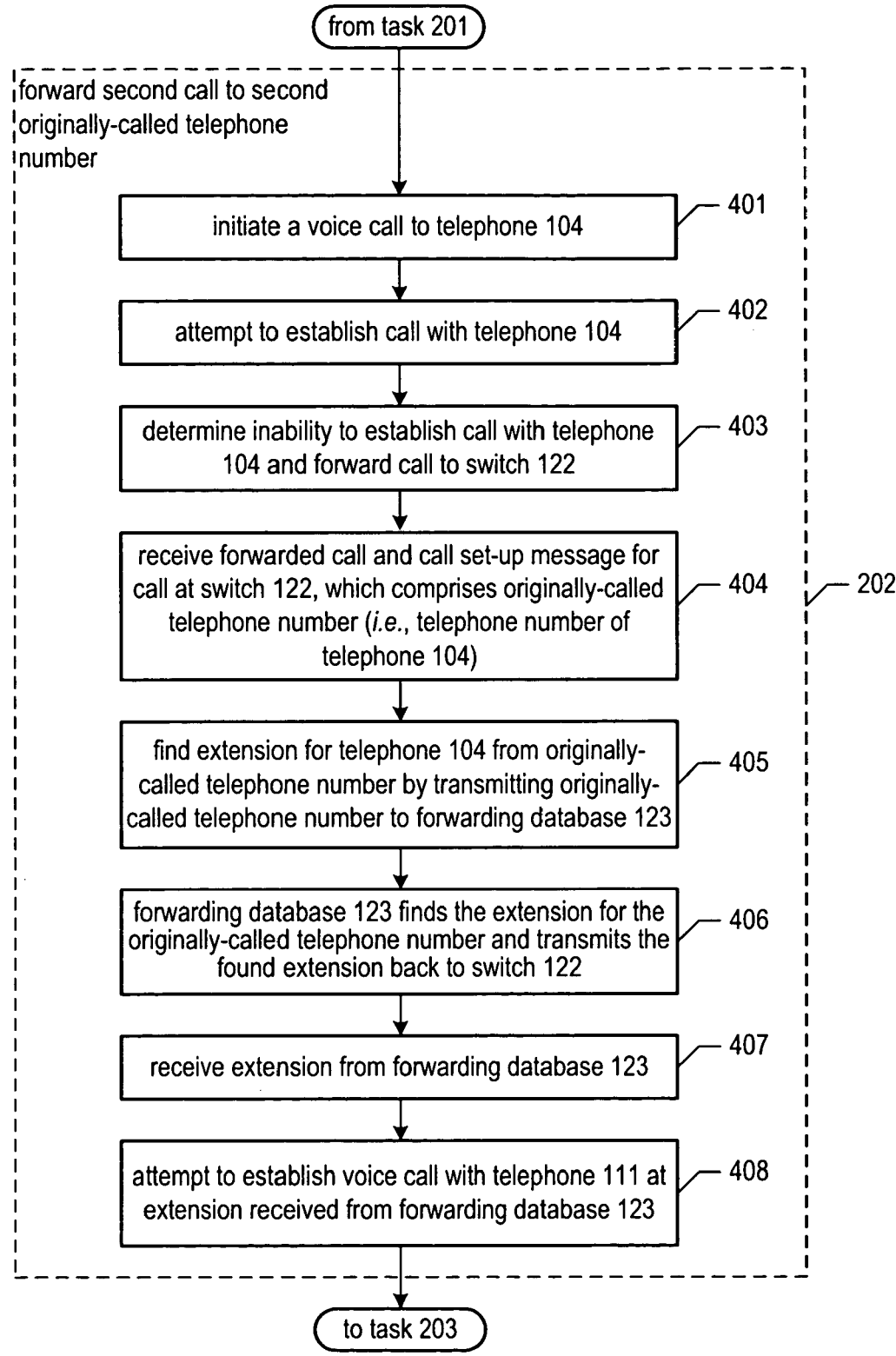
FIG. 4 depicts a flowchart of the salient tasks associated with the operation of task 202.

FIG. 4 depicts a flowchart of the salient tasks associated with the operation of task 202.

At subtask 401, a voice call is initiated in well-known fashion, from telephone 102 to telephone 104 by dialing the PSTN telephone number 723-753-6642.

At subtask 402, switching network 121 attempts to set up the call with telephone 104 in well-known fashion.

At subtask 403, switching network 121 is unable to set up the call with telephone 104, and, therefore, forwards the call to switch 122. This could be because there was no one available to answer telephone 104, or because all calls to telephone 104 were conditionally or unconditionally forwarded to switch 122. When a call to telephone 104 is forwarded to switch 122, switching network 121 transmits, as part of subtask 403, a set-up message (e.g., an SS7 ISUP set-up message, etc.) to switch 122, which message contains the originally-called telephone number (i.e., 723-753-6642—the telephone number of telephone 104).

At subtask 404, switch 122 receives the set-up message and by examining it in well-known fashion, knows that the call has been forwarded to it. Because the call was forwarded to it, switch 122 extracts the originally-called telephone number from the set-up message and begins the process of establishing the call to the extension associated with the originally-called telephone number (i.e., the telephone number of telephone 111).

At subtask 405, switch 122 transmits the originally-called telephone number (i.e., 723-753-6642) to forwarding database 123.

At subtask 406, forwarding database 123 finds the extension (i.e., extension 111) that corresponds to the originally-called telephone number and transmits the found extension back to switch 122.

At subtask 407, switch 122 receives the extension (i.e., extension 111) from forwarding database 123.

At subtask 408, switch 122 attempts, in well-known fashion, to establish the voice call with extension 111.

Figure 5:
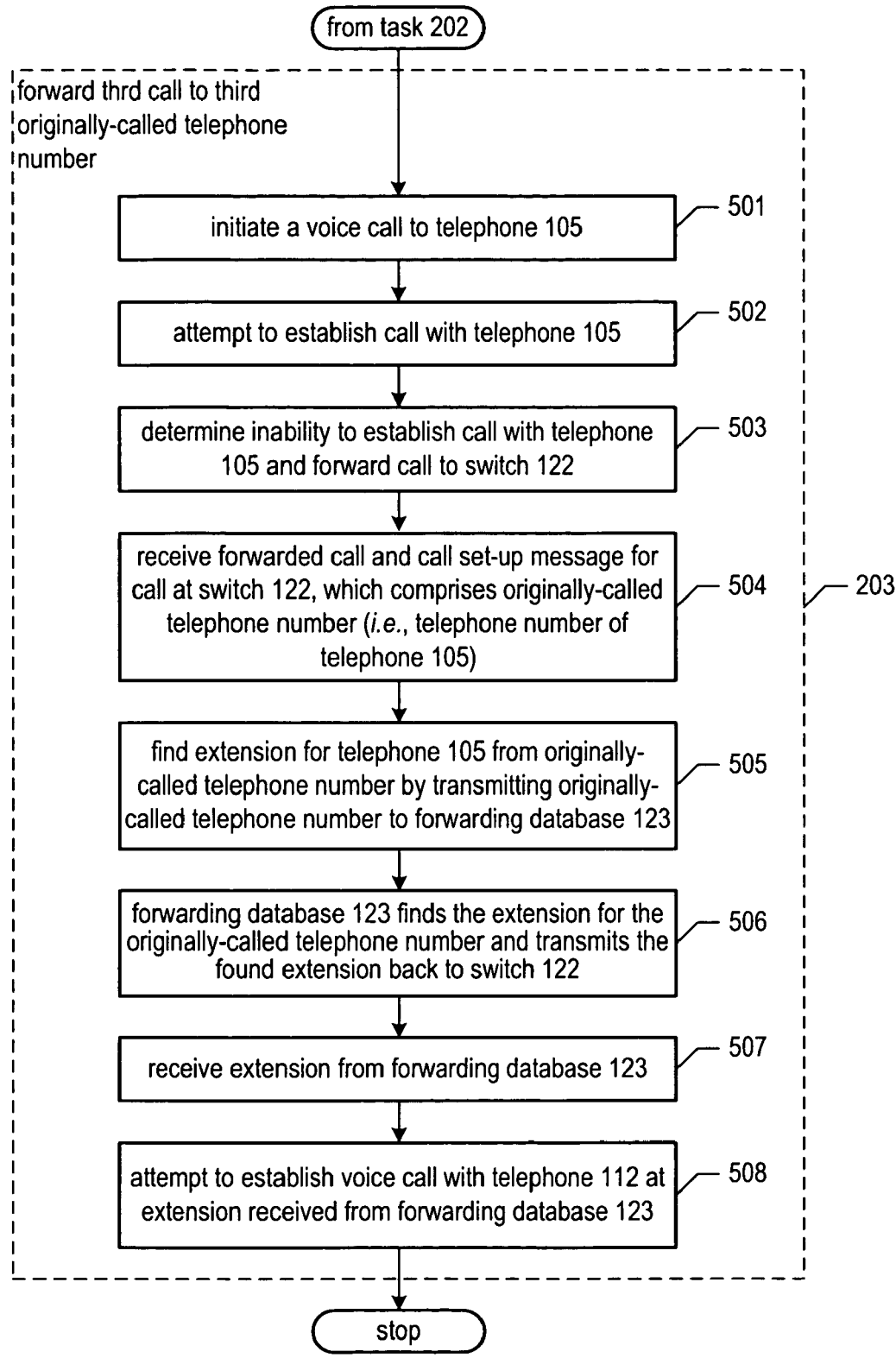
FIG. 5 depicts a flowchart of the salient tasks associated with the operation of task 203.

FIG. 5 depicts a flowchart of the salient tasks associated with the operation of task 203.

At subtask 501, a voice call is initiated in well-known fashion, from telephone 101 to telephone 105 by dialing the PSTN telephone number 723-753-6642.

At subtask 502, switching network 121 attempts to set up the call with telephone 105 in well-known fashion.

At subtask 503, switching network 121 is unable to set up the call with telephone 105, and, therefore, forwards the call to switch 122. This could be because there was no one available to answer telephone 105, or because all calls to telephone 105 were conditionally or unconditionally forwarded to switch 122. When a call to telephone 105 is forwarded to switch 122, switching network 121 transmits, as part of subtask 503, a set-up message (e.g., an SS7 ISUP set-up message, etc.) to switch 122, which message contains the originally-called telephone number (i.e., 723-753-6642—the telephone number of telephone 105).

At subtask 504, switch 122 receives the set-up message and by examining it in well-known fashion, knows that the call has been forwarded to it. Because the call was forwarded to it, switch 122 extracts the originally-called telephone number from the set-up message and begins the process of establishing the call to the extension associated with the originally-called telephone number (i.e., the telephone number of telephone 112).

At subtask 505, switch 122 transmits the originally-called telephone number (i.e., 723-753-6642) to forwarding database 123.

At subtask 506, forwarding database 123 finds the extension (i.e., extension 112) that corresponds to the originally-called telephone number and transmits the found extension back to switch 122.

At subtask 507, switch 122 receives the extension (i.e., extension 112) from forwarding database 123.

At subtask 508, switch 122 attempts, in well-known fashion, to establish the voice call with extension 112.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method for establishing a voice telephone call with a device that has an address outside the address space of the Public Switched Telephone Network, said method comprising: receiving a first call set-up message for a first voice telephone call that has been forwarded from a first originally-called telephone number, wherein said first originally-called telephone number is an address in the address space of the Public Switched Telephone Network; and attempting, without human intervention and without intervention of an interactive voice response system, to establish a voice telephone call with a first device that has an address outside the address space of the Public Switched Telephone Network; wherein said address of said first device is found from said first originally-called telephone number; and wherein the caller of said first voice telephone call is not notified of the forwarding from said first originally-called telephone number.

2. The method of claim 1 further comprising mapping said first originally-called telephone number to said address of said device.

3. The method of claim 1 wherein said device is a telephone extension of a private branch exchange.

4. The method of claim 3 wherein said private branch exchange serves a hotel.

5. The method of claim 1 further comprising:
receiving a second call set-up message for a second voice telephone call that has been forwarded from a second originally-called telephone number, wherein said second originally-called telephone number is an address in the address space of the Public Switched Telephone Network; and
attempting to establish said voice telephone call with said first device;
wherein said address of said first device is found from said second originally-called telephone number.

6. The method of claim 5 wherein said first originally-called telephone number is a residential telephone number and said second originally-called telephone number is a business telephone number.

7. The method of claim 1 further comprising:
receiving a second call set-up message for a second voice telephone call that has been forwarded from a second originally-called telephone number, wherein said second originally-called telephone number is an address in the address space of the Public Switched Telephone Network; and
attempting to establish said second voice call with a second device that has an address outside the address space of the Public Switched Telephone Network;
wherein said address of said second device is found from said second originally-called telephone number.

8. The method of claim 7 wherein said first originally-called telephone number is a first business telephone number and said second originally-called telephone number is a second business telephone number.

9. The method of claim 7 wherein said first originally-called telephone number is a residential telephone number and said second originally-called telephone number is a business telephone number.

10. The method of claim 7 wherein said first originally-called telephone number is a first residential telephone number and said second originally-called telephone number is a second residential telephone number.

11. An apparatus for establishing a voice telephone call with a device that has an address outside the address space of the Public Switched Telephone Network, said apparatus comprising: a switch for:
- (1) receiving a first call set-up message for a first voice telephone call that has been forwarded from a first originally-called telephone number, wherein said first originally-called telephone number is an address in the address space of the Public Switched Telephone Network L and
- (2) attempting, without human intervention and without intervention of an interactive voice response system, to establish a voice telephone call with a first device that has an address outside the address space of the Public Switched Telephone Network; wherein said address of said first device is found from said first originally-called telephone number, and wherein the caller of said first voice telephone call is not notified of the forwarding from said first originally-called telephone number; and a memory for mapping said first originally-called telephone number to said address of said device.

12. The apparatus of claim 11 wherein said memory is a forwarding database.

13. The apparatus of claim 11 wherein said device is a telephone extension of a private branch exchange.

14. The apparatus of claim 13 wherein said private branch exchange serves a hotel.

15. The apparatus of claim 11 wherein said switch is also for:
- (3) receiving a second call set-up message for a second voice telephone call that has been forwarded from a second originally-called telephone number, wherein said second originally-called telephone number is an address in the address space of the Public Switched Telephone Network; and
- (4) attempting to establish said voice telephone call with said first device;
- wherein said address of said first device is found from said second originally-called telephone number.

16. The apparatus of claim 15 wherein said first originally-called telephone number is a residential telephone number and said second originally-called telephone number is a business telephone number.

17. The apparatus of claim 11 wherein said switch is also for:
- (3) receiving a second call set-up message for a second voice telephone call that has been forwarded from a second originally-called telephone number, wherein said second originally-called telephone number is an address in the address space of the Public Switched Telephone Network; and
- (4) attempting to establish said second voice call with a second device that has an address outside the address space of the Public Switched Telephone Network;
- wherein said address of said second device is found from said second originally-called telephone number.

18. The apparatus of claim 17 wherein said first originally-called telephone number is a first business telephone number and said second originally-called telephone number is a second business telephone number.

19. The apparatus of claim 17 wherein said first originally-called telephone number is a residential telephone number and said second originally-called telephone number is a business telephone number.

20. The apparatus of claim 17 wherein said first originally-called telephone number is a first residential telephone number and said second originally-called telephone number is a second residential telephone number.

* * * * *